F. M. MORTEN.
APPARATUS FOR CLEANING THE HULLS OF SHIPS.
APPLICATION FILED APR. 1, 1907.
918,890.
Patented Apr. 20, 1909.
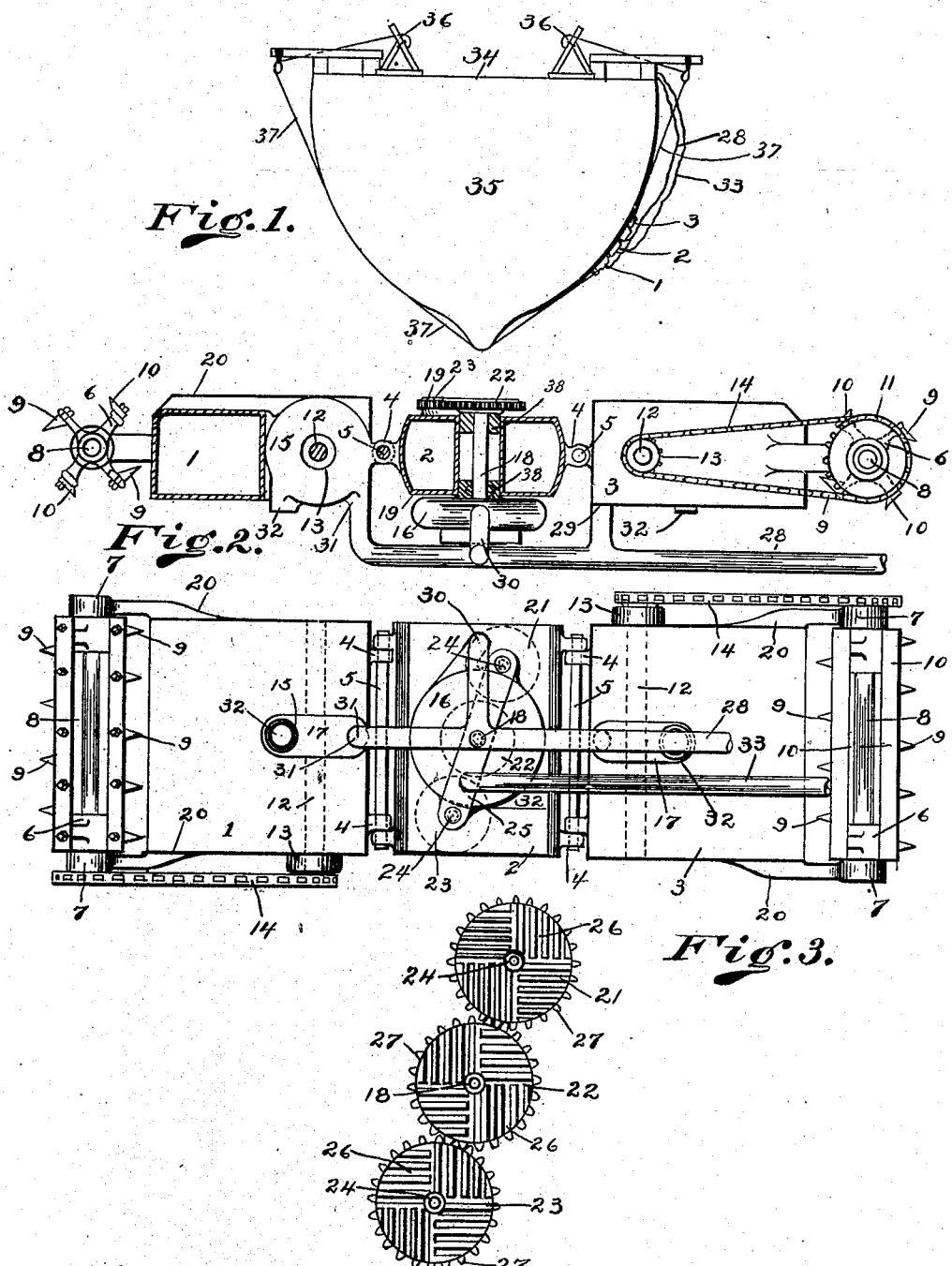

UNITED STATES PATENT OFFICE.

FRANK M. MORTEN, OF NORWOOD, OHIO.

APPARATUS FOR CLEANING THE HULLS OF SHIPS.

No. 918,890.   Specification of Letters Patent.   Patented April 20, 1909.

Application filed April 1, 1907. Serial No. 365,668.

*To all whom it may concern:*

Be it known that I, FRANK M. MORTEN, a citizen of the United States, residing at the city of Norwood, in the county of Hamilton and State of Ohio, have invented certain new and useful Improvements in Apparatus for Cleaning the Hulls of Ships, of which the following is a specification.

Ships at sea, especially in warm climates, or if on a long or continued voyage, gather on their hulls, below the water line, a foul foreign growth consisting of barnacles, mollusks, sea grass, fungus and such matter, and this growth impedes the speed of the ship; it must often be removed and usually, to remove such foreign growth, it is necessary to place the vessel in dry dock and remove this foreign matter by hand, taking a great deal of time, being very expensive and losing time for the vessel.

The object of my invention is to remove this growth by an apparatus or device, while the vessel is in the water, saving time and doing the work cheaply and satisfactorily.

My invention consists essentially in combining in a unique and practical form a picking or striking device to remove the barnacles and mollusks, a cutting, shearing or scraping device for removing the sea grass and scum or foul matter off the hull, in combination with a device for spreading oil over the cleaned surface, making it smooth and presenting to the water a hull for fast service, the oil at the same time proving objectionable to the barnacles; these various devices being joined together with yielding or hinged joints, so that the apparatus can and will accommodate itself to the varying contour of the ship's hull; the entire apparatus being held up against the sides and bottom of the hull by a series of buoyancy chambers and operated through a cable attached to the deck, the whole run by water motors and water power.

The apparatus is simple in construction, cheap of manufacture and efficient in use.

In the accompanying drawing forming part of this specification, Figure 1 is a view in elevation of the end of a ship with my device attached. Fig. 2 is a side view of my apparatus, partly in section. Fig. 3 is a plan view thereof, and Fig. 4 a detached view showing the face of the oil spreading device.

The apparatus consists of three air tight chambers 1, 2 and 3. Each chamber is provided with eyes or ears 4, which when in line and contiguous position allow a rod as 5 to pass through them, making a hinge connection, so that the chambers can adjust themselves to the various positions required in passing over the hull of the ship.

At the outer end of the buoyancy chambers 1 and 3 is located a revolving frame 6 journaled in brackets 7 on a shaft 8. On this revolving frame 6 are located two sets of pickers or strikers 9 and two sets of knives, cutters or scrapers 10, which extend all the way across the frame 6, the pickers 9 only being used at intervals as shown. I preferably alternate the pickers 9 and knives 10 on the frame. On the brackets 7 at each end on opposite sides I place a sprocket wheel 11 (see Fig. 2). Through the rear end of the chambers 1 and 3, I put shafts 12 and at their extremity place journals 13 on each of which I place sprocket wheels over which sprocket chains 14 pass and at the opposite ends the chains 14 pass over the sprocket wheels 11. Water motors 15, 16 and 17 are provided and shafts 12 pass through the motors 15 and 17, the central motor 16 having a shaft 18 journaled in top and bottom 19 and 19 of the buoyancy chamber 2 (see Fig. 2), the journals being marked 38. The chambers 1 and 3 are also supported by braces 20.

On the chamber 2, I connect in any suitable manner a hollow pipe or piece 25 in which are journaled by hollow shafts 24, 24, oil spreaders 21 and 23, the spreader 22 being journaled on shaft 18 of the water motor 16. These shafts 24 and 18 are hollow, the same as piece 25, so that oil can flow freely through them. These shafts lead to the face of the spreaders. The faces of the spreaders are each provided with a series of grooves or concaved shaped gutters 26 through which the oil flows to be spread. At their peripheries, these spreaders 21, 22 and 23 carry teeth 27, which mesh with each other, so that they will all revolve to spread the oil.

A water pipe 28 of flexible material reaches from the deck to the apparatus. This pipe 28 enters the water motor 17 at 29, the water motor 16 at 30 and the water motor 15 at 31, the water passing out of the motors at points 32, the water is forced through the motors 15, 16 and 17 by means of a force pump (not shown) on deck, forcing the water through pipe 28. The oil is transmitted from deck through a flexible pipe 33 to the hollow piece 25 and through this piece flows through the hollow shafts in the spreaders 21, 22 and 23 to their face and finally into the grooves 26 to be spread upon the hull of the vessel.

On the deck 34 of the ship 35, I place windlasses 36, 36, a cable 37 passing around underneath the ship and from one windlass to the one on the opposite side of the deck, the apparatus being connected in any convenient and practical manner to said cable.

The device operates as follows, to-wit: The apparatus is attached to a cable 37, which is wound on or off of the windlasses 36, 36, according to the side of the ship on which the apparatus is at work. By winding the cable 37, the apparatus is pulled over the face of the ship's hull, the cable and the buoyancy chambers 1, 2 and 3 keeping it up against the ship and the hinge connection 4 and 5 between said chambers 1, 2 and 3 allowing of said apparatus to hug and conform to the exact contour of the ship's hull so that the apparatus will at all times be so close to the ship's hull to do efficient work and still not mar the ship, the braces 20 keeping the device from working too close to the hull. Water is then forced from deck by a pump (not shown) through pipe 28 and by it delivered to the water motors 15, 16, and 17 which motors operate shafts 12, 12, and 18 and motion is thus imparted by shafts 12, 12, to sprocket chain 14 which imparts motion to shafts 8, 8, passing over the sprocket wheels 11, thus the pickers and cutters 9 and 10 are revolved to strike the barnacles off the ship's hull and to remove the sea grass and other matter; at the same time shaft 18 revolves the oil spreader 22 and its teeth 27 mesh with the teeth 27 on oil spreaders 21 and 23 thus imparting motion to them, the oil having been pumped (or allowed to flow by gravity) through pipe 33 to the hollow piece 25 and through it to hollow shafts 18, 24 and 24, the oil filling the groves 26 in the spreaders, the revolving motion of the spreaders thoroughly, evenly and efficiently spreads the oil over the ship's hull; of course while all these motions and manipulations are in progress, the device is itself moving over the face of the hull by the operator winding on the cable 37, and when one part or space is cleaned another is commenced until the entire ship is cleaned.

It will be seen that the device operates on either side of the ship without reversal, as it works the same from both ends, as, working from either end I first strike the barnacles with my pickers or strikers 9 and then follow this up with the cutters or scrapers 10 which remove the sea grass and foul matter and scrape the hull clean and the alternate arrangement of these pickers and scrapers work in unison to remove all the barnacles, sea grass and other matter, nothing of a foreign nature on the ship's hull escaping their work and this scraping and cleaning is followed by giving the hull a coat of oil, which is done efficiently and uniformly; so that, by this simple, unique and practical arrangement, when the device reaches either side of the ship on its cleansing tour, it need only be slid over laterally, so that a new path may be cut, cleaned and oiled simultaneously.

It will be readily seen that this device will quickly and thoroughly clean the hull of the ship and do it when the vessel is in the water. I prefer to have the vessel quiet and at a stand, but can use it, if necessary, when the vessel is in motion and this may be found necessary when the ship is on a protracted voyage.

It will readily be seen that this combined combination of strikers, cutters and oil spreaders coact and operate to cleanse the ship as well as it can be done by human agency. Of course the water and oil may be transmitted to the apparatus in any other manner than herein specifically set forth and the apparatus may be moved over the face of the ship's hull in any other manner.

Motors other than those herein set forth may be used to operate the pickers, cutters and oil spreaders and if desired they may be placed on the deck or on an auxiliary raft or small boat.

The buoyancy chambers may be made of any shape, size or contour and of any material.

If desired the apparatus may be made of one elongated buoyancy chamber and the various cleaning devices attached in some desirable manner.

I may employ as many pickers, cutters and oil spreaders as will be found desirable and efficient.

The buoyancy chambers may be connected together, so as to conform to the contour of the ship's hull in any other manner than herein shown and described.

The pickers, cutters and oil spreaders may be made of any shape and size and the oil may be spread on the ship in any other desired manner by the spreaders.

What I claim as new and of my invention and desire to secure by Letters Patent is:—

1. In an apparatus for cleaning the hulls of ships, a series of buoyancy chambers lying contiguous to one another, said buoyancy chambers loosely connected together, a series of pickers and scrapers, said pickers and scrapers connected to the end buoyancy chambers, oil spreaders, said oil spreaders connected to the central buoyancy chamber, motors for operating said pickers, scrapers and oil spreaders, and connecting parts, all operating as set forth.

2. In an apparatus for cleaning the hulls of ships, a series of buoyancy chambers lying contiguous to one another, said buoyancy chambers loosely connected together, a series of pickers and scrapers, said pickers and scrapers connected to a revolving frame, said revolving frame connected to the buoyancy chambers at each end of the apparatus, oil spreaders, said oil spreaders connected to the central buoyancy chamber, motors for operating said pickers, scrapers and oil spreaders, and connecting parts, all combined and operating as set forth.

3. In an apparatus for cleaning the hulls of ships, pickers and scrapers, said pickers and scrapers mounted on a revolving frame, oil spreaders, mechanism for operating said pickers, scrapers and oil spreaders, buoyancy chambers, said pickers, scrapers and oil spreaders connected to said buoyancy chambers, said parts so constructed and connected together as to permit of automatic adjustment to the ship's hull, when passing over said hull in operation, as and for the purposes set forth.

4. In an apparatus for cleaning the hulls of ships, pickers, scrapers, said pickers and scrapers mounted on a revolving frame, oil spreaders, said oil spreaders revolving to spread the oil, in combination with means located between said revolving frame and the oil spreaders, to allow said parts to move and adjust themselves to the contour of the ship's hull, as set forth.

5. In an apparatus for cleaning the hulls of ships, revolving mechanism for cutting and scraping off the foreign matter from the hull, in combination with oil spreading mechanism, oil and water pipes connected to said mechanism, and a cable for supporting the same, combined and operating as set forth.

6. In an apparatus for cleaning the hulls of ships, means for removing the foreign matter from the hull, means for spreading oil on said hull, said means loosely connected together to permit of automatic adjustment to the contour of the hull, and connecting parts, all operating and combined as set forth.

FRANK M. MORTEN.

Witnesses:
  HENRY BAER,
  H. E. CARSTENS.